United States Patent [19]

Nose

[11] Patent Number: 4,466,097
[45] Date of Patent: Aug. 14, 1984

[54] CONTROL SIGNAL-MULTIPLEXING CIRCUIT

[75] Inventor: Shigeru Nose, Sagamihara, Japan

[73] Assignee: Tokyo Shibaura Denki Kabushiki Kaisha, Kawasaki, Japan

[21] Appl. No.: 289,907

[22] Filed: Aug. 4, 1981

[30] Foreign Application Priority Data

Sep. 3, 1980 [JP] Japan .................. 55/121885

[51] Int. Cl.³ .............................................. H04J 3/02
[52] U.S. Cl. ............................. 370/112; 370/119; 84/1.13; 328/34; 340/870.13
[58] Field of Search ............... 370/112, 113, 114, 119; 307/243, 244; 340/870.13; 328/96, 97, 104, 154, 34, 35; 84/1.13, 1.26, 1.01

[56] References Cited

U.S. PATENT DOCUMENTS

| | | | |
|---|---|---|---|
| 3,601,634 | 8/1971 | Ebertin ............................. | 370/112 |
| 3,872,257 | 3/1975 | Bleickardt et al. ................ | 370/112 |
| 3,899,951 | 8/1975 | Griffith et al. .................... | 340/825.8 |
| 3,922,493 | 11/1975 | Brenig et al. ..................... | 370/112 |
| 4,299,153 | 11/1981 | Hoskinson et al. ................ | 84/1.13 |
| 4,402,247 | 9/1983 | Bione ................................. | 84/1.13 |

FOREIGN PATENT DOCUMENTS

2438196  4/1975  Fed. Rep. of Germany .

Primary Examiner—Douglas W. Olms
Attorney, Agent, or Firm—Finnegan, Henderson, Farabow, Garrett & Dunner

[57] ABSTRACT

A control signal-multiplexing circuit for producing various forms of multiplexed control signals from control signals of a plurality of channels. The circuit comprises a multiplexer for selecting control signals of a plurality of channels by scanning and multiplexing the control signals by time division; and a control signal converting circuit which is supplied with output signals from the multiplexer, converts the signals of the respective channels included in the output signals into various forms of control signals, multiplexes the control signals, and sends forth the multiplexed control signals to the corresponding control lines.

16 Claims, 7 Drawing Figures

4,466,097

CONTROL SIGNAL-MULTIPLEXING CIRCUIT

BACKGROUND OF THE INVENTION

This invention relates to a circuit for multiplexing a large number of control signals.

Where a large number of control signals are processed as in an electronic musical instrument, a circuit for multiplexing a large number of control signals by time division is generally applied in order to decrease a number of control circuits and that of lines. Further, it sometimes happens that during the multiplexing process, a single control signal is converted into a plurality of control pulses.

The prior art control signal-multiplexing circuit has an arrangement as shown in FIG. 1. Control signals $CH_l$ to $CH_n$ of a plurality of channels are conducted to the corresponding latch circuits $10_l$ to $10_n$ to be latched therein in a prescribed timing. These latch circuits $10_l$ to $10_n$ have a function of properly shaping the waveforms of the control signals $CH_l$ to $CH_n$. Where the control signals $CH_l$ to $CH_n$ have their waveforms properly shaped in advance, then the latch circuits are not required. Output signals from the latch circuits $10_l$ to $10_n$ are conducted to the corresponding control signal-converting circuits $12_l$ to $12_n$. The control signal-converting circuits $12_l$ to $12_n$ comprise rising pulse-generating circuits $14_l$ to $14_n$ for producing rising pulses upon receipt of the output control signals $CH_l$ to $CH_n$ from the latch circuits $10_l$ to $10_n$; falling pulse-generating circuits $16_l$ to $16_n$ for sending forth falling pulses; and state-holding circuits $18_l$ to $18_n$ for issuing state-holding pulses. With, for example, an electronic musical instrument, the rising or falling pulses are applied to produce certain musical tones. The state-holding pulses are used to sustain certain musical tones.

Output pulses from the rising pulse generators $14_l$ to $14_n$ are conducted to a first multiplexer 20, and then transmitted to a first control line 22 after being multiplexed by selective scanning. Similarly, output pulses from the falling pulse generators $16_l$ to $16_n$ are delivered to a second multiplexer 24 and then transmitted to a second control line 26 after being multiplexed by selective scanning. Output pulses from the state-holding circuits $18_l$ to $18_n$ are supplied to a third multiplexer and then sent forth to a third control line 30 after being multiplexed by selective scanning.

The rising pulse generators $14_l$ to $14_n$ judge at a prescribed interval (for each scanning period of the multiplexer) whether or not the control signals $CH_l$ to $CH_n$ have risen. Where the control signals have risen then the rising pulse generators $14_l$ to $14_n$ issued a rising pulse having a width corresponding to one channel period. The falling pulse generators $16_l$ to $16_n$ judge at the above-mentioned prescribed interval whether or not the control signals $CH_l$ to $CH_n$ have fallen. Where the control signals have fallen, then the falling pulse generators $16_l$ to $16_n$ produce a falling pulse having a width corresponding to the aforementioned one channel period. The state-holding circuits $18_l$ to $18_n$ judge in a prescribed timing whether a control signal retains a high or low level. Once a high level is detected, the state-holding circuits $18_l$ to $18_n$ cause the high level to be retained, until the state holding circuits $18_l$ to $18_n$ are reset.

Where, however, the rising pulse generators $14_l$ to $14_n$, falling pulse generators $16_l$ to $16_n$ and state-holding circuits $18_l$ to $18_n$ are provided for each channel, then the control signal-converting circuits, multiplexers and signal lines inevitably increase in number, undesirably enlarging a pattern area required for the integration of a circuit. Where a signal for resetting the state-holding circuit is multiplexed, then a demultiplexer has to be provided in order to separate the multiplexed reset signal into a plurality of components and allocate a divided reset pulse component to each channel.

SUMMARY OF THE INVENTION

It is accordingly the object of this invention to provide a control signal multiplexing circuit allowing for a high integration of a circuit.

To attain the above-mentioned objects, this invention provides a control signal-multiplexing circuit which is characterized in that output control signals from a plurality of channels are selected through scanning by a single multiplexer; and the control signals of the selected channels are successively processed by a control signal-converting common circuit, thereby producing a plurality of multiplexed control signals.

A control signal-multiplexing circuit embodying this invention has the advantage that control signal-converting circuits, multiplexers and signal lines are noticeably decreased in number; and it is unnecessary to provide a demultiplexer for separating a multiplexed reset pulse into reset pulse components for the respective channels, thereby reducing an area of an integrated circuit.

BRIEF DESCRIPTION OF THE DRAWINGS

Other objects and advantages of the invention will become apparent from the following detailed description when taken in conjunction with the accompanying drawings in which.

DETAILED DESCRIPTION OF THE PREFERRED EMBODIMENTS

Figure 1:
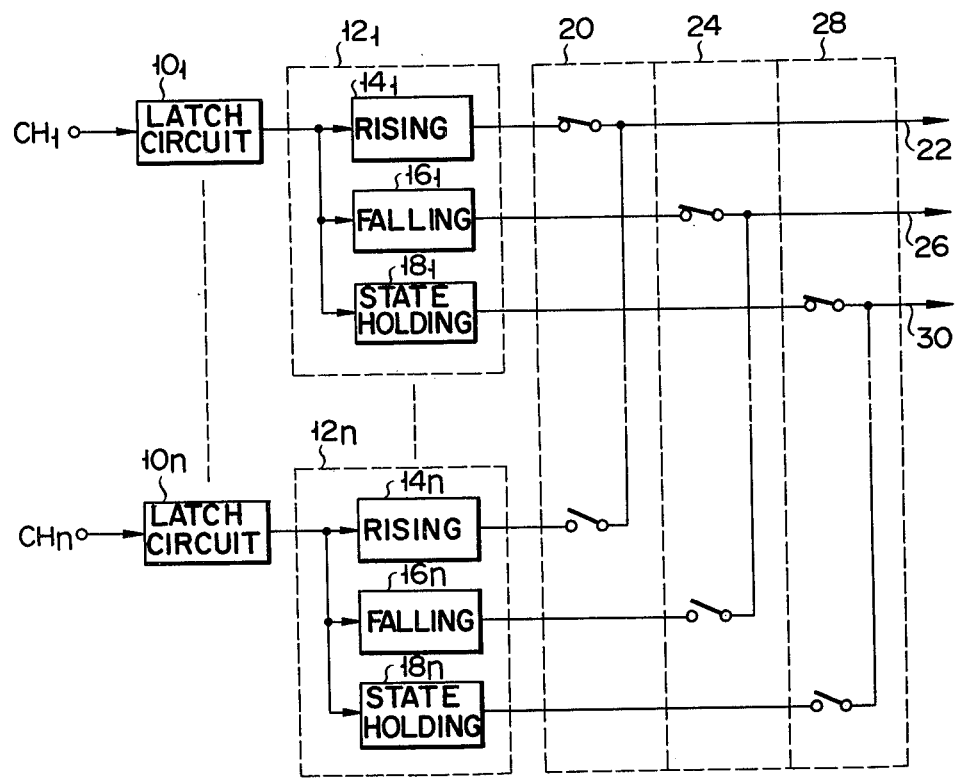
FIG. 1 is a block diagram of a prior art control signal-multiplexing circuit.
Figure 2:
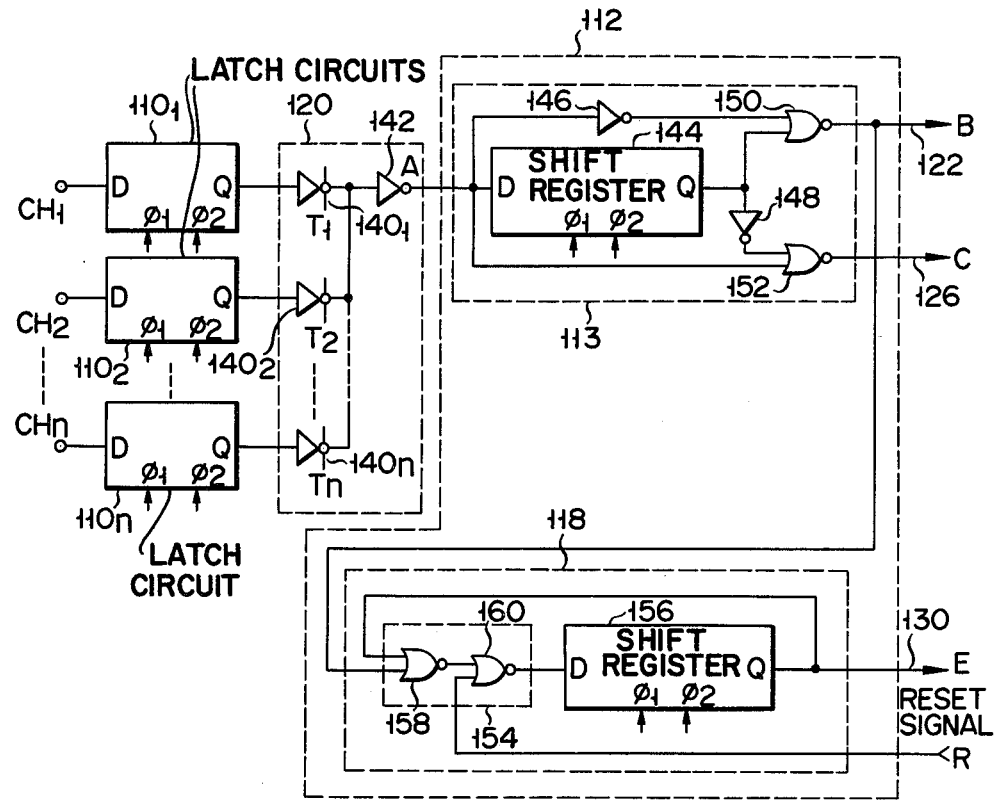
FIG. 2 shows the arrangement of a control signal-multiplexing circuit embodying this invention.

Referring to FIG. 2, control signals $CH_l$ to $CH_n$ of a plurality of channels are conducted to the corresponding latch circuits $110_l$ to $110_n$. These latch circuits are shift registers respectively actuated by two clock pulses $\phi_1$, $\phi_2$ having different phases. A control signal supplied to the input terminal D of each shift register is latched in a prescribed timing. The latch circuits $110_l$ to $110_n$ are used to prevent the level of a control signal of a selected channel from being changed during a period in which the respective channels are selected by the later described multiplexer 120. When supplied to the multiplexer 120, output signals from the latch circuits $110_l$ to $110_n$ are selected by scanning. The multiplexer 120 comprises clocked inverters $140_l$ to $140_n$ respectively drived by multiplexing signals $T_l$ to $T_n$ having an equal pulse width and supplied with channel control signals $CH_l$ to $CH_n$ and an inverter 142 to which output signals from the clocked inverters $140_l$ to $140_n$ are supplied by wired OR connection. The multiplexer 120 multiplexes the control signals of the respective channels. A multiplexed output signal A from the multiplexer 120 is supplied to a control signal-converting circuit 112, which converts the multiplexed signal A into various forms of control pulses for each channel, multiplexes the various forms of control pulses to provide a plurality of multiplexed control pulses having different functions, and sends forth the plural multiplexed control pulses having different functions to the first, second and third control lines 122, 126, 130.

To produce multiplexed control signals composed of rising pulses, falling pulses and state-holding pulses, respectively, the control signal-converting circuit 112 comprises a first control pulse-generating circuit 113 for producing rising and falling pulses and a second control pulse-generating circuit 118 for forming a state-holding pulse.

The first control pulse-generating circuit 113 comprises a shift register 144, inverters 146, 148 and first and second NOR gates 150, 152. The multiplexed output signal A from the multiplexer 120 is supplied to the data input terminal D of a serial type shift register 144 having the same number of bits as the channels. This shift register 144 is actuated by two clock pulses $\phi_1$, $\phi_2$ having different phases. These clock pulses $\phi_1$, $\phi_2$ have a frequency corresponding to the prescribed channel period (indicated by $\tau$ in FIG. 3) of the aforesaid multiplexing signals $T_l$ to $T_n$. Therefore, that component of a multiplexed control signal corresponding to a given channel which is supplied to the input terminal D of the shift register 144 is sent forth from the output terminal Q of the shift register 144 in a time delayed by one scanning period of the multiplexer 120. Consequently, comparison between the level of an input signal to the shift register 144 and that of an output signal therefrom can detect rising or falling changes of a control signal of a given channel.

Figure 3:
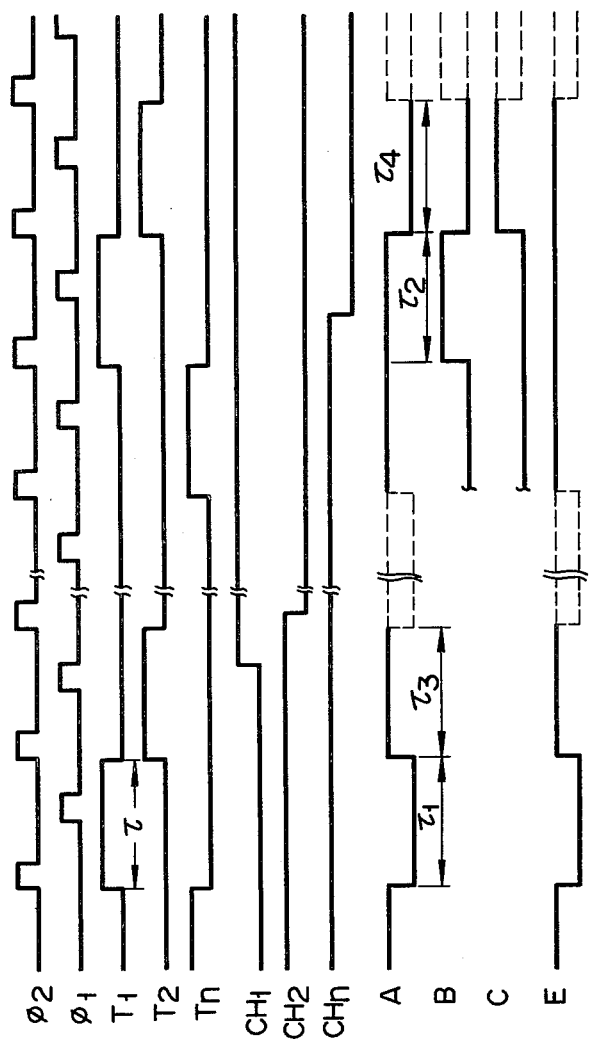
FIG. 3 is a timing chart illustrating the operation of the control signal-multiplexing circuit of FIG. 2.

With the control-signal-multiplexing circuit of this invention, two clock pulses used to actuate not only the latch circuits $110_l$ to $110_n$ used as shift registers but also the shift register 144 of the first control pulse-generating circuit 113 consist of a clock pulse $\phi_2$ which rises in synchronization with the operation of the multiplexing signals $T_l$ to $T_n$ and a clock pulse $\phi_1$ which has the same frequency as the first-mentioned clock pulse $\phi_2$ and operates in a time delayed by a prescribed length of time from the clock pulse $\phi_2$ (FIG. 3).

An output signal from the shift register 144 is supplied to the first terminal of a first NOR gate 150. A multiplexed output signal A from the multiplexer 120 is conducted to the second terminal of the first NOR gate 150 through the inverter 146. An output signal from the first NOR gate 150 is transmitted to a control circuit (not shown) through the first control line 122, and also to the second control pulse-generating circuit 118.

An output signal from the shift register 144 is delivered to the first terminal of a second NOR gate 152 through the inverter 148. The multiplexed output signal A from the multiplexer 120 is sent forth to the second terminal of the second NOR gate 152. An output signal from the second NOR gate 152 is supplied to a control circuit (not shown) through the second control line 126.

The second control pulse-generating circuit 118 is a ring counter circuit comprising, for example, a data control circuit 154 and an n-bit serial shift register 156 actuated by the aforementioned two clock pulses $\phi_1$, $\phi_2$ having different phases. The data control circuit 154 comprises a NOR gate 158 whose first terminal is supplied with an output signal from the first control pulse-generating circuit 113, and whose second terminal is supplied with an output signal from the n-bit serial shift register 156; and a NOR gate 160 whose first terminal is supplied with an output signal from the NOR gate 158 and whose second terminal is supplied with a multiplexed reset signal R. An output signal from the NOR gate 160 is supplied to the input terminal D of the shift register 156. The output terminal Q of the shift register 156 is connected to a control circuit through the third control line 130.

Description is now given with reference to FIG. 3 of the operation of the control signal-multiplexing circuit of this invention arranged as described above.

Now let it be assumed that clock pulses $\phi_2$, $\phi_1$ and multiplexing signals $T_l$ to $T_n$ are supplied from signal sources (not shown) in the timing illustrated in FIG. 3, and that control signals $CH_l$ to $CH_n$ of an n number of channels have their lengths changed as illustrated in FIG. 3. In this case, the control signal $CH_l$ of the first channel is latched by the latch circuit $110_l$ in the same thing as that in which the clock pulse $\phi_1$, for example, rises. The control signal $CH_2$ of the second channel is latched by the latch circuit $110_2$ in the same thing as that in which the clock pulse $\phi_1$, for example, rises. The control signal $CH_n$ of the n channel is latched by the latch circuit $110_n$ in the same timing as that in which the clock pulse $\phi_1$, for example, rises. Output signals from the latch circuits $110_l$ to $110_n$ are supplied to the corresponding clocked inverters $140_l$ to $140_n$. The output signals are selected by scanning in the same timing as that in which the multiplexing signals $T_l$ to $T_n$, for example, rise, and conducted to the inverter 142 to be converted into a multiplexed signal A. This multiplexed signal A is conducted to the first control pulse-generating circuit 113, and then sent forth from the output terminal Q of the shift register 144 in a timing delayed by one scanning period of the multiplexer 120 while passing through the shift register 144.

The control signal $CH_l$ of the first channel has a low level which was issued in a timing delayed by one scanning period of the multiplexer 120 by the shift register 144 and selected during the previous scanned channel period $\tau_1$. Where the control signal $CH_l$ of the first channel selected during the present scanned channel period $\tau_2$ rises to a high level, then an output signal from the inverter 146 has a low level, causing a high level rising pulse to be obtained through the first NOR gate 150.

Where the control signal $CH_2$ of the second channel issued in a timing delayed by one scanning period of the multiplexer 120 by the shift register 144 and selected during the previous scanned channel period $\tau_3$ has a high level, and the control signal $CH_2$ of the second channel selected during the present scanned channel period $\tau_4$ has fallen to a low level, then an output signal from the inverter 148 has a low level, causing a high level falling pulse to be obtained through the second NOR gate 152. Consequently, a multiplexed signal B formed of a rising pulse is sent forth from the first NOR gate 150, and a multiplexed signal C formed of a falling pulse is issued from the second NOR gate 152.

Where, with the second control pulse-generating circuit 118, a rising pulse is conducted to the first terminal of the NOR gate 158 during any channel period through the first NOR gate 150 of the first control pulse-generating circuit 113, then an output signal from the NOR gate 158 retains a low level, regardless of the level of a signal supplied to the second terminal of the NOR gate 158. Since a multiplexed reset signal supplied to the second terminal of a NOR gate 160 generally has a low level, an output signal from the NOR gate 160 has a high level. A high level output signal from the NOR gate 160 is supplied to the second terminal of the NOR gate 158 in a timing delayed by one scanning period by the shift register 156. Therefore, a high level state-holding pulse is always obtained during a channel period delayed from the aforesaid channel period to an extent approximating several times one scanning period of the multiplexer 120. As a result, a multiplexed state-holding pulse E is issued from the output terminal Q of the shift register 156.

Where the subject control signal-multiplexing circuit is supplied with a high level multiplexed reset signal R, then an output signal from the NOR gate 160, namely, an input signal to the shift register 156 has a low level. Therefore, a state-holding pulse is not generated in a channel supplied with the high level multiplexed reset signal R.

Figure 4:
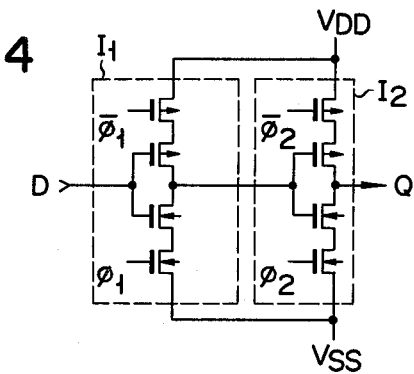
FIG. 4 indicates the arrangement of a one-bit portion of a shift register included in FIG. 2.

A control signal-multiplexing circuit embodying this invention which is arranged as described above enables control signal-converting circuits, multiplexers and signal lines to be decreased in number to a far greater extent that has been possible with the conventional control signal-multiplexing circuit. Further, the control signal-multiplexing circuit of the invention eliminates the necessity of providing a demultiplexer for dividing a multiplexed reset signal into a plurality of components, and, when integrated therefore, occupies an area reduced by that extent.

Where the shift registers 144, 156 of FIG. 2 are each formed of, for example, a dynamic circuit comprising clocked inverters $I_1$, $I_2$ each provided with CMOS transistors arranged as shown in FIG. 4, then elements can be reduced in number to a far greater extent than when the shift registers 144, 156 are each formed of a static circuit, that is, to about 1/2.5 of the number required in the latter case. Where, therefore, the subject control signal-multiplexing circuit is integrated, a pattern area can be reduced to, for example, about one-third of what might be otherwise required. The dynamic circuit of FIG. 4 corresponds to a one-bit portion of the aforesaid shift registers 144, 156.

Where a control signal is generated by the intermittent operation of a mechanical switch, it sometimes happens that a control signal thus produced is contaminated by chattering. With the circuit arrangement of FIG. 2, however, one scanning period of a multiplexing signal acts as a chattering-suppressing period (that is, a period in which chattering does not lead to the occurrence of a malfunction). Where a number n of control signal channels is extremely large, and a clock pulse is let to have a high frequency in order to form, for example, each of the aforementioned shift registers 144, 156 of a dynamic circuit, then it is possible to eliminate the effect of chattering on a multiplexed control signal by rendering a chattering-suppressing period (one scanning period of a multiplexing signal) longer than a period in which chattering is actually occurring. Now let it be assumed that 100 channels are provided, and a clock pulse has a frequency of 1 kHz (that is, one period indicates 1 ms). Then, a chattering-suppressing period is measured as $$1 \text{ ms} \times 100 = 100 \text{ ms}$$

Namely, the chattering-suppressing period is made sufficiently long to eliminate a control signal contaminated by chattering.

Figure 5:
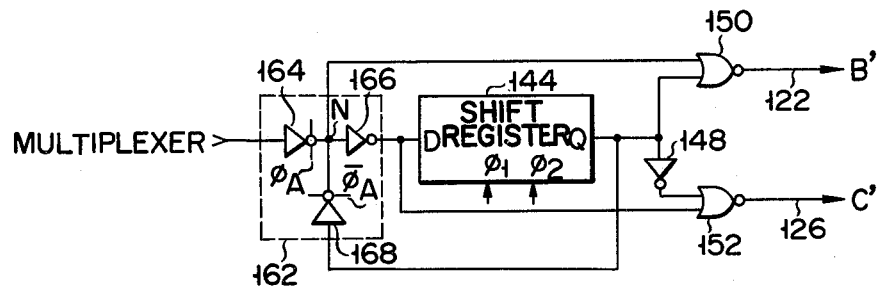
FIG. 5 shows the arrangement of a modification of a first control pulse-generating circuit included in FIG. 2.

If, in case a small number of channels are provided, it is desired to allow a clock pulse to have a high frequency in order to render the shift registers, for example, 144, 156 of the dynamic type and to prolong a chattering-suppressing period, then it is advised to let a data-selecting circuit 162 arranged as shown in FIG. 5 interpose the first control pulse-generating circuit 113 of FIG. 2. The data-selecting circuit 162 comprises a first clocked intverter 164 supplied with a multiplexed output signal A from the multiplexer 120; an inverter 166 which is supplied with an output signal from a first clocked inverter 164, and an output signal from which is conducted to the shift register 144; and a second clocked inverter 168 which is supplied with an output signal from the shift register 144, and whose output terminal is connected to the node N between the first clocked inverter 164 and inverter 166. The node N is connected to the first terminal of the first NOR gate 150. The second terminal of the first NOR gate 150 is supplied with an output signal from the shift register 144. An output signal from the first NOR gate 150 is sent forth to the first control line 122. The first terminal of the second NOR gate 152 is supplied with an output signal from the shift register 144 through the inverter 148. The second terminal of the second NOR gate 152 is supplied with an output signal from the inverter 166 of the Data-selecting circuit 162. An output signal from the second NOR gate 152 is delivered to the second control line 126.

Figure 6:
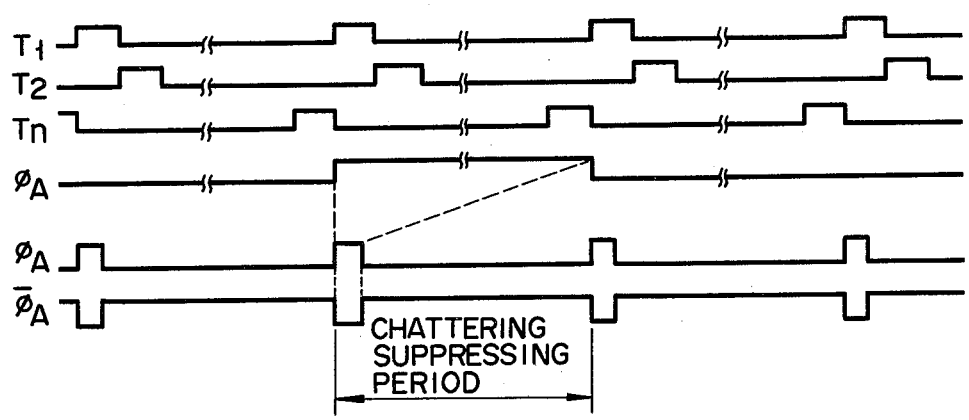
FIG. 6 in a timing chart showing the operation of a control signal-multiplexing circuit where the first control pulse-generating circuit of FIG. 5 is applied to the control signal-multiplexing circuit of FIG. 2.

A clock pulse $\phi_A$ for driving the first clocked inverter 164 is issued for a longer period of time than that in which it is desired to suppress chattering. The high level period of the clock signal $\phi_A$ coincides with one scanning period of a multiplexing signal, and is synchronized with the channel periods of the multiplexing signals. FIG. 6 indicates relationship between the timing in which the clock signal $\phi_A$ is issued and the timing in which the multiplexing signals $T_1$ to $T_n$ are sent forth. As seen from FIG. 6, the period of the clock pulse $\phi_A$ is the same as the chattering suppressing period. A clock signal $\overline{\phi_A}$ for during the second clocked inverter 168 has an opposite phase to that of the clock signal $\phi_A$.

Description is now given of the operation of the first control pulse-generating circuit. Where the clock pulse $\phi_A$ has a high level and consequently a clock signal $\overline{\phi_A}$ has a low level, output signals of the respective channels delivered from the multiplexer 120 are written in the shift register 144. During one scanning period of the multiplexer 120 in which the writing is carried out, a signal B' formed of multiplexed rising pulses and a signal C' formed of multiplexed falling pulses are respectively sent forth from the first NOR gate 150 and second NOR gate 152 through the same operation as carried out in the embodiment of FIG. 2.

Where the clock signal $\phi_A$ has a low level and consequently the clock signal $\overline{\phi_A}$ has a high level, then the above-mentioned written data is held by a ring counter formed of the inverter 166, shift register 144, and second clocked inverter 168. During the data-holding period the first NOR gate 150 is supplied with an output signal from the shift register 144 and a signal inverted from the output signal from the shift register 144 by the second clocked inverter 168. Therefore, the first NOR gate 150 always sends forth a low level signal. The second NOR gate 152 is supplied with a signal inverted from an output signal from the shift register 144 by the inverter 148 and a signal inverted from an output signal from the shift register 144 first by the second clocked inverter 168 and then by the inverter 166. Therefore, the second NOR gate 152 always issues a low level signal.

With the control signal-multiplexing signal embodying this invention which is provided with the data-selecting circuit 162 and arranged as described above, a clock pulse can be allowed to have a high frequency in order to render the shift registers 144, 156 of the dynamic type and a chattering-suppressing period can be prolonged, even where a small number of channels are provided.

Figure 7:
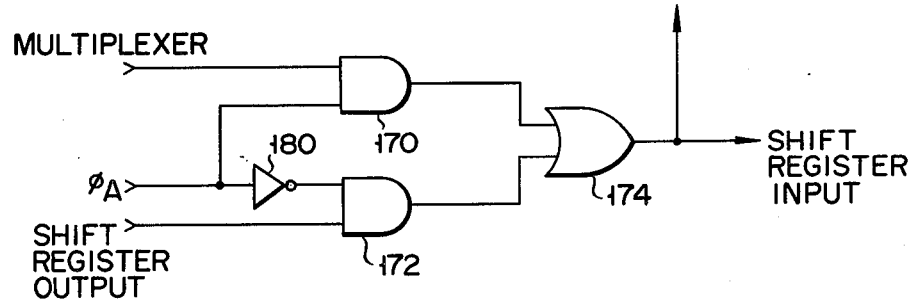
FIG. 7 indicates the arrangement of a modification of a data-selecting circuit used with the first control pulse-generating circuit of FIG. 5.

Description is now given with reference to FIG. 7 of a data-selecting circuit according to another embodiment of this invention. This data-selecting circuit comprises a first AND gate 170, second AND gate 172, OR gate 174 and inverter 180. The first terminal of the first AND gate 170 is supplied with an output signal from the multiplexer 120. The second terminal of the first AND gate 170 is supplied with a clock pulse $\phi_A$ which has the same pulse width as one scanning period of the multiplexer 120 and has a period corresponding to a prescribed chattering-suppressing period. The first terminal of the second AND gate 172 is supplied with an output signal from the first shift register. The second terminal of the second AND gate 172 is supplied with the aforesaid clock pulse $\phi_A$ through an inverter 180. An OR gate 174 is supplied with an output signal from the first AND gate 170 and also an output signal from the second AND gate 172. An output signal from the OR gate 174 is supplied to the shift register 144 and first NOR gate 150. The data-selecting circuit of FIG. 7 is operated in the same manner as the data-selecting circuit 162 according to the preceding embodiment. The data-selecting circuit is not limited to the types of the aforementioned embodiments, but may be formed of an assembly of other logic circuits.

What is claimed is:

1. A control signal-multiplexing circuit which comprises:
   a multiplexer having a multiplexing signal for scanning and multiplexing by time division control signals selected from a plurality of channels to produce a first multiplexed control signal; and
   a control signal-converting circuit for receiving said first multiplexed control signal, detecting whether the logic level of the control signals of the respective channels included in said first multiplexed control signal has risen or not, and in the event a rise is detected, generating a second multiplexed control signal formed of a rising pulse, and delivering said second multiplexed control signal to a first control line.

2. The control signal-multiplexing circuit according to claim 1, wherein said multiplexer comprises a plurality of clocked inverters which are provided for the respective channels, and which are scanned and driven by the multiplexing signal.

3. The control signal-multiplexing circuit according to claim 1, wherein said control signal-converting circuit comprises:
   a first shift register for delaying an output signal from the multiplexer by one scanning period of the multiplexing signal; and
   a first logic circuit for comparing the logic level of of the control signals included in said first multiplexed control signal with that of an output signal from the first shift register, detecting whether the logic level of the control signals included in said first multiplexed control signal has risen or not, and, in the event a rise is detected, generating said second multiplexed control signal formed of said rising pulse, and delivering said second multiplexed control signal to said first control line.

4. The control signal-multiplexing circuit according to claim 3, wherein said first logic circuit comprises:
   an inverter supplied with the output signal from the multiplexer; and
   a NOR gate having a first terminal supplied with the output signal from said inverter, and a second terminal supplied with the output signal from said first shift register.

5. The control signal multiplexing circuit according to claim 3, wherein said control signal-converting circuit further comprises a second logic circuit, connected to the output terminal of the first logic circuit for maintaining the logic level of the respective channels of said second multiplexed control signal at a high logic level after the respective channels has risen to the high logic level, and delivering a state-holding pulse to a second control line.

6. The control signal-multiplexing circuit according to claim 5, wherein said second logic circuit comprises:
   a first NOR gate having a first terminal supplied with an output signal from the first logic circuit;
   a second NOR gate having a first terminal supplied with an output signal from the first NOR gate, and a second terminal supplied with a reset signal for resetting the logic level of the respective channels of said second multiplexed control signal at a low logic level; and
   a second shift register which delays the output signal from the second NOR gate by one scanning period of the multiplexing signal, and an output signal supplied to the second terminal of the first NOR gate and to the second control line.

7. The control signal-multiplexing circuit according to any one of claims 3 to 5, wherein said first shift register is of the dynamic type.

8. The control signal-multiplexing circuit according to claim 6, wherein said first and second shift registers are of the dynamic type.

9. The control signal-multiplexing circuit according to claim 1, wherein said control signal-converting circuit comprises:
   a data-selecting circuit for selecting said first multiplexed control signal from the multiplexer;
   a first shift register for delaying a selected first multiplexed control signal from the data-selecting circuit by one scanning period of the multiplexing signal; and
   a first logic circuit for comparing the logic level of said selected first multiplexed control signal with that of an output signal from the first shift register, detecting whether the logic level of the selected first multiplexed control signal has risen or not, and, in the event a rise is detected, generating said second multiplexed control signal formed of said rising pulse, and delivering said second multiplexed control signal to the first control line.

10. The control signal-multiplexing circuit according to claim 9, wherein said data-selecting circuit includes:
a first clocked inverter actuated by a clock signal $\phi_A$ having the same pulse width as one scanning period of the multiplexing signal and issued for a period of time corresponding to a prescribed chattering-suppressing period, said first clocked inverter being supplied with said first multiplexed control signal from the multiplexer;
a second clocked inverter supplied with said output signal from the first shift register and actuated by a clock signal $\overline{\phi}_A$ having a phase opposite to that of the clock signal $\phi_A$; and
an inverter supplied with the output signal from the first clocked inverter and the output signal from the second clocked inverter, and having an output signal supplied to the first shift register; and wherein
said first logic circuit includes:
a NOR gate having a first terminal connected to the output terminals of the first and second clocked inverters of the data-selecting circuit, and a second terminal connected to the output terminal of the first shift register.

11. The control signal-multiplexing circuit according to claim 9, wherein said data-selecting circuit includes:
a first AND gate having a first terminal supplied with said first multiplexed control signal from the multiplexer, and a second terminal supplied with a clock signal $\phi_A$ having the same pulse width as one scanning period of the multiplexing signal and issued for a period of time corresponding to a prescribed chattering-suppressing period;
a second AND gate having a first terminal supplied with said output signal from the first shift register and a second terminal is supplied with the clock pulse $\phi_A$ through the inverter; and
an OR gate supplied with output signals from the first and second AND gates, and having an output signal supplied to the first shift register.

12. The control signal-multiplexing circuit according to claim 9, wherein said control signal-converting circuit further comprises a second logic circuit, connected to the output terminal of the first logic circuit for maintaining the logic level of the respective channels of said second multiplexed control signal at a high logic level after the respective channels have reached the high logic level, and producing a state-holding pulse to a second control line.

13. The control signal-multiplexing circuit according to claim 12, wherein said second logic circuit includes:
a first NOR gate having a first terminal supplied with an output signal from the first logic circuit;
a second NOR gate having a first terminal supplied with an output signal from the first NOR gate, and a second terminal supplied with a reset signal for resetting the logic level of the respective channels of said second multiplexed control signal at a low logic level; and
a second shift register which delays the output signal from the second NOR gate by one scanning period of the multiplexing signal, and an output signal supplied to the second control line through the second terminal of the first NOR gate.

14. The control signal-multiplexing circuit according to any one of claims 9 to 12, wherein the first shift register is of the dynamic type.

15. The control signal-multiplexing circuit according to claim 13, wherein the first and second shift registers are of the dynamic type.

16. The control signal-multiplexing circuit according to claim 1, wherein the multiplexer and control signal-converting circuit are integrated.

* * * * *